W. SCHAAKE.
INSULATOR.
APPLICATION FILED FEB. 19, 1914.
1,217,508.
Patented Feb. 27, 1917.
2 SHEETS—SHEET 1.
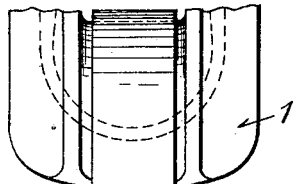
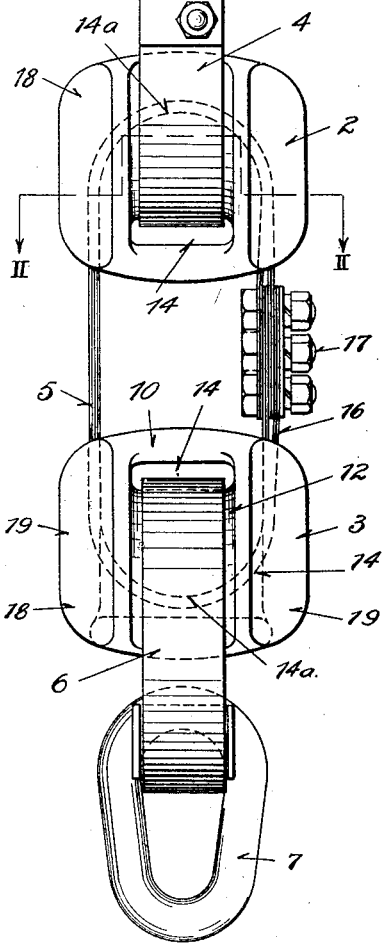
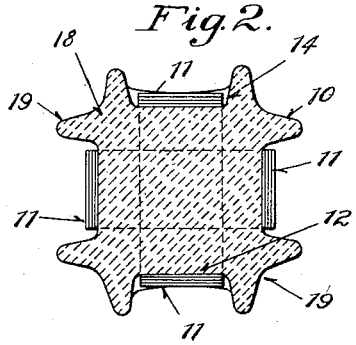
WITNESSES:
Stephen Wach
D. H. Mace
INVENTOR
William Schaake
BY
Wesley G. Carr
ATTORNEY W. SCHAAKE.
INSULATOR.
APPLICATION FILED FEB. 19, 1914.
1,217,508.
Patented Feb. 27, 1917.
2 SHEETS—SHEET 2.
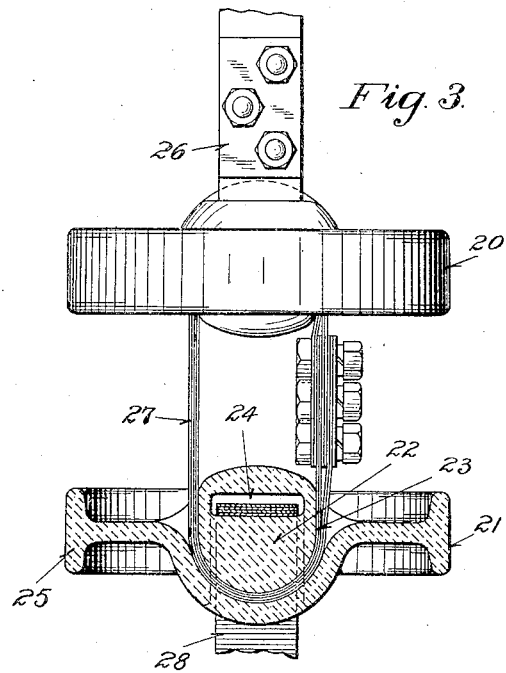
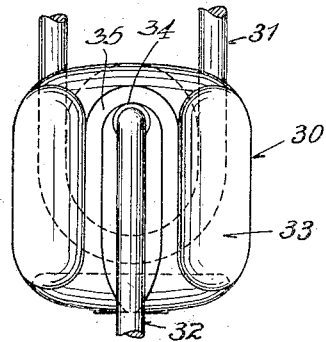
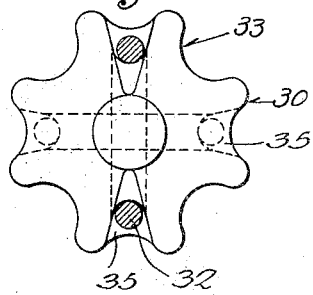
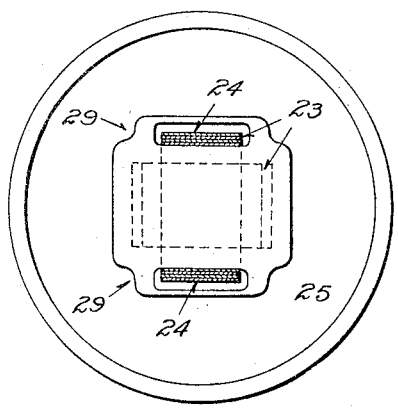

UNITED STATES PATENT OFFICE.

WILLIAM SCHAAKE, OF PITTSBURGH, PENNSYLVANIA, ASSIGNOR TO WESTINGHOUSE ELECTRIC AND MANUFACTURING COMPANY, A CORPORATION OF PENNSYLVANIA.

INSULATOR.

1,217,508.

Specification of Letters Patent.

Patented Feb. 27, 1917.

Application filed February 19, 1914. Serial No. 819,827.

*To all whom it may concern:*

Be it known that I, WILLIAM SCHAAKE, a citizen of the United States, and a resident of Pittsburgh, in the county of Allegheny and State of Pennsylvania, have invented a new and useful Improvement in Insulators, of which the following is a specification.

My invention relates to insulators, and it has special reference to insulators of the so called "strain" or "suspension" type.

The object of my invention is to provide an insulator which, by reason of its configuration, shall be adapted to withstand relatively high mechanical and electrical strains.

Another object of my invention is to provide a light and compact insulator which may be molded readily and inexpensively into its final form, and which shall embody a comparatively small amount of material for the mechanical and electrical strains it its adapted to sustain.

Insulators of the general class to which my invention pertains, have been employed in the past, but they have been fashioned to receive flexible circular supporting members or cables, which when interlinked with each other and maintained under tension, subjected the interposed portions of the insulator to excessive mechanical stress, inasmuch as the strains were localized over a comparatively small area.

Furthermore, no provision was made for liberal creepage distances between the adjacent parts of the several interlinked supporting members or cables, whereby voltage limitations were imposed which materially restricted the use of these insulators.

According to my invention, I propose to obviate the difficulties of the prior art and to provide an insulator of exceptional mechanical and electrical properties.

In the accompanying drawings, Figure 1 is a view, in elevation, of a plurality of insulators constructed and suspended in spaced vertical relation, in accordance with my invention. Fig. 2 is a view, in section, of one of the insulators shown in Fig. 1, the section being taken along the line II—II. Fig. 3 is a view, partially in elevation and partially in section, of a modified form of my invention. Fig. 4 is a bottom plan view, partially in section, of one of the devices shown in Fig. 3, and Figs. 5 and 6, are, respectively a side elevation and a bottom plan view of a further modification of my invention.

Referring to Figs. 1 and 2 of the drawing, the apparatus here shown comprises a plurality of insulators 1, 2 and 3 and a supporting ring 7 which are suspended in spaced vertical relation, by means of a plurality of flexible laminated straps or supporting members 4, 5 and 6.

The insulators 1, 2 and 3 are of like construction, and each comprises a body 10 of insulating material having a plurality of sets of oppositely disposed longitudinal side recesses 11 which have substantially flat bottom surfaces 12. Laterally elongated openings 14 are provided near the respective ends of the body 10 and between the oppositely disposed flat side surfaces of each set. The openings 14 are of substantially the same width as the flat surfaces 12 and their top and bottom surfaces are cylindrically curved whereby the opposite flat surfaces of each set are joined by a substantially smooth curved portion $14^a$.

The several openings 14 and their associated longitudinal recesses 11 are adapted to receive the respective flexible flat straps or supporting members 4, 5 and 6, and, by reason of this construction and arrangement of interlinked parts, the tension of the flat straps or members is distributed over a considerable area of the interposed insulator, thus reducing the stress per unit of area and correspondingly increasing the resistance to the entire mechanical strain.

Each of the supporting straps or members 4, 5 and 6 is preferably composed of a plurality of thin strips or laminations 16 which are placed together to form a comparatively flat flexible unit. The respective ends of each strap member are joined together by a clamping device 17 of any suitable type.

The intermediate portions 18 of each insulator, which are located between the several longitudinal recesses 12, are provided with recesses 19 which are substantially parallel thereto, for the purpose of providing a liberal creepage distance between the flexible supporting members which are located in the respective recesses 12.

In Figs. 3 and 4, I have shown my invention in connection with a plurality of "disk type" insulators 20 and 21. Each of the insulators 20 and 21 comprises a body portion 22 having a plurality of sets of oppositely disposed flat surfaces 23 and a plurality of elongated openings 24 between the several sets of surfaces, the arrangement of parts being substantially similar to those already set forth. The body 22 is, moreover, provided with an annular centrally disposed disk portion 25, of old and familiar form. Flexible laminated supporting members or straps 26, 27 and 28 are provided for suspending the several insulators in the manner hereinbefore set forth. Recesses 29 are disposed intermediate the flat surfaces 23 which engage the straps to provide ample creepage distances between the straps.

Reference may now be had to Figs. 5 and 6, which illustrate an insulator 30 of the same general type as those shown in the preceding figures, said insulator being specially adapted to receive wires or cables 31 and 32. The insulator 30 is, therefore, provided with correspondingly shaped openings and recesses in lieu of elongated or rectangular openings and flat faced recesses, as set forth in connection with the insulators already described. It should be noted that this form of my invention is also provided with intermediate recesses or curved grooves 33 for the purpose of increasing the creepage distance between the supporting members. The recesses that are adapted to receive the wires or cables 31 and 32 are relatively deep, in comparison with the intermediate recesses 33, and coöperate with the passages 34 through the body of the insulator to form continuously curved grooves which smoothly receive the wires or cables 31 and 32. In order to allow these recesses to be cut deeply without sacrificing the strength of the insulator, overhanging portions 35 are provided, extending substantially across the cable-receiving recesses.

These and other modifications which may be made without departing from the spirit of my invention, are intended to be included within the scope of the appended claims.

I claim as my invention:

1. A strain insulator comprising a body of insulating material having a plurality of sets of oppositely disposed flat side surfaces, laterally elongated openings having inner curved walls between the respective sets of flat surfaces, and unconnected recesses disposed between the said flat surfaces.

2. The combination with a plurality of insulators having oppositely disposed flat side surfaces, laterally elongated openings between said surfaces, and unconnected recesses disposed between the said flat surfaces, of flexible flat straps disposed in corresponding openings for joining said insulators together.

3. An insulator comprising a body of insulating material having a plurality of sets of oppositely disposed side recesses and openings joining the recesses of the respective sets for receiving a flexible supporting member, said insulator being also provided with a plurality of unconnected recesses severally disposed between the side recesses.

4. An insulator comprising a body of insulating material having a plurality of sets of oppositely disposed recesses to receive supporting members, and intermediate recesses of curved contour for providing relatively long creepage distances between the adjacent supporting members.

5. An insulator comprising a body of insulating material having a plurality of sets of oppositely disposed and relatively deep recesses, adapted to receive supporting members, the recesses composing each of said sets being connected by a passage extending through the said body of insulating material, and relatively shallow intermediate recesses of curved contour disposed between each adjacent pair of said recesses for providing relatively long creepage distances between the adjacent supporting members.

6. An insulator comprising a body of insulating material having a plurality of sets of oppositely disposed and substantially parallel longitudinal recesses in the outer surface thereof and openings for severally connecting alternate recesses with the recesses opposite thereto, the intermediate sets of recesses being unconnected.

7. A strain insulator of substantially cylindrical form having perforations for engaging strain supports extending through the insulator at right-angles to each other at opposite ends of the same, two pairs of grooves on the sides of said insulator to receive the engaging supports, the grooves for one strain support being located in a plane substantially at right-angles and extended in opposite direction to those for the other strain support with a longitudinal groove between each pair of adjoining support-receiving grooves for increasing the electrical strength without decreasing the mechanical strength of the insulator.

8. A strain insulator, the cross-section of which is substantially inscribable in a circle and having a maximum amount of insulating material in all directions between the loops of the strain supports attached to it to increase the mechanical and internal electrical strength of the insulator, perforations at opposite ends of the insulator and at right angles to each other through which the supports are respectively adapted to extend, grooves on the outer surface of the insulator continuing from and substantially at right angles to the perforations and through which the supports are adapted to pass, the loop of one strain support being adapted to extend from one perforation along adjacent diametrical grooves in an opposite direction to the loop of the other strain support adapted to extend from the other perforation along the other diametrical pair of grooves, and additional grooves on the surface of the insulator alternating with the support-receiving grooves and substantially parallel thereto for increasing the surface electrical strength without materially decreasing the mechanical strength.

In testimony whereof, I have hereunto subscribed my name this 14th day of Feb., 1914.

WILLIAM SCHAAKE.

Witnesses:
NILS A. WAHLBERG,
B. B. HINES.

Copies of this patent may be obtained for five cents each, by addressing the "Commissioner of Patents, Washington, D. C."